Dec. 18, 1928.
J. M. REIFSNIDER
1,695,294
AUTOMOBILE BUMPER
Filed June 21, 1927
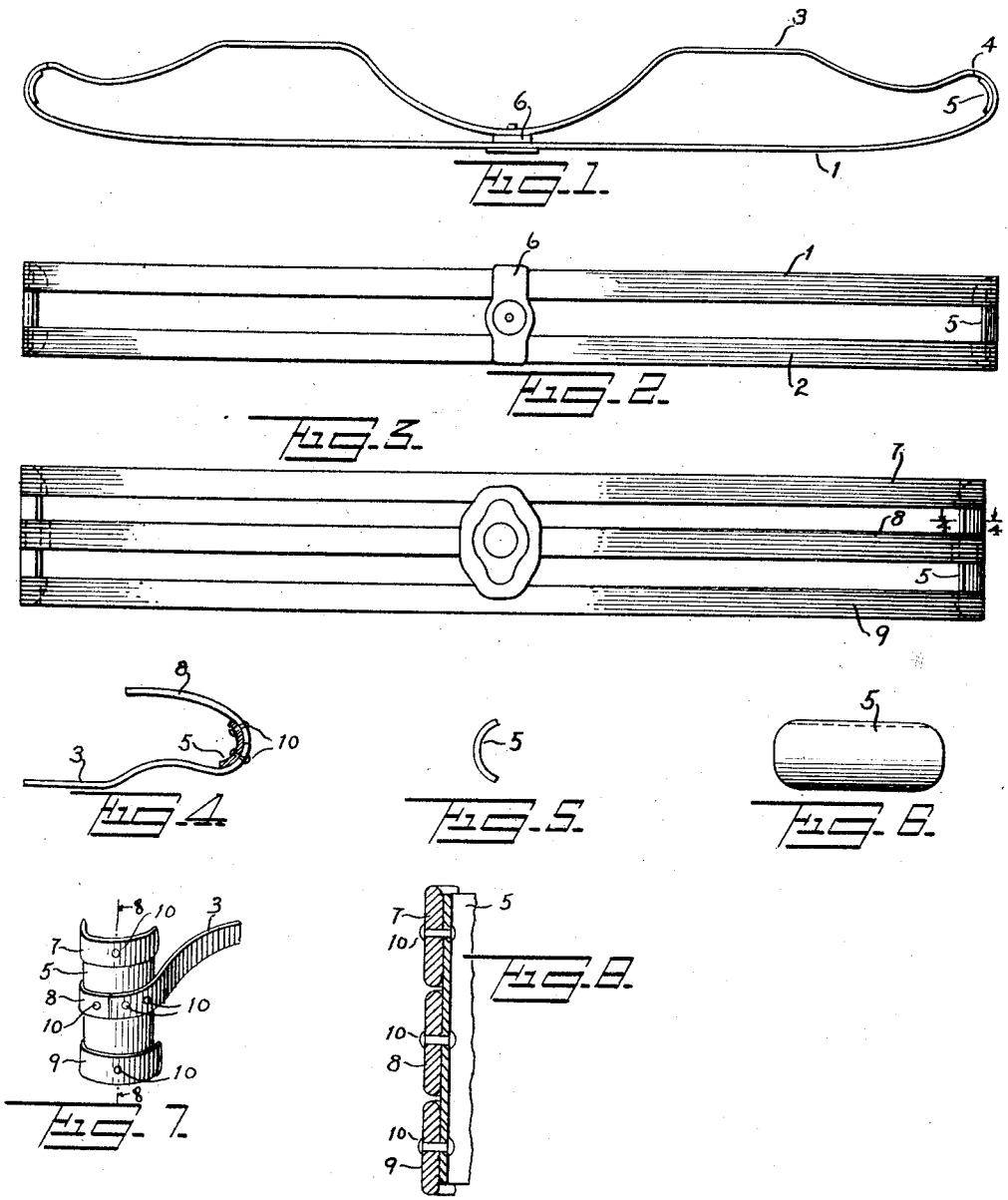
INVENTOR
John M. Reifsnider.
BY
Frederick S. Duncan,
ATTORNEY Patented Dec. 18, 1928.

1,695,294

UNITED STATES PATENT OFFICE.

JOHN M. REIFSNIDER, OF ADRIAN, MICHIGAN, ASSIGNOR TO AMERICAN CHAIN COMPANY, INC., A CORPORATION OF NEW YORK.

AUTOMOBILE BUMPER.

Application filed June 21, 1927. Serial No. 200,310.

This invention relates to automobile bumpers and more particularly to a means of connecting together the ends of the bars of a bumper of a multi-bar type.

The principal object of the invention is to provide a bumper of the multi-bar type with plates for connecting the ends of the bars of the impact section with a rear or supporting bar. The bars may be spot welded, riveted or bolted to the plate.

A further object is the provision of a bumper which will be easy to manufacture, capable of sustaining severe impacts and will be pleasing to the eye.

A clear conception of the construction and further objects of the invention may be had from the following specification in conjunction with the accompanying drawings in which:

Fig. 1 discloses a bumper embodying the invention in plan view.

Fig. 2 is a front elevation of Fig. 1.

Fig. 3 is a front elevation of a three bar bumper.

Fig. 4 is a cross-section through 4—4, of one end of Fig. 3.

Figs. 5 and 6 show two views of one of the curved connecting plates.

Fig. 7 is a detailed view in rear perspective of the end of Fig. 3.

Fig. 8 is a cross-section through 8—8 of Fig. 7 on an enlarged scale.

The now preferred form of embodiment of the invention as shown in Figs. 1 and 2, comprises an impact section having bars 1 and 2 disposed in vertical spaced relation and a rear or supporting bar 3. The loop ends of bars 1 and 2 may terminate at any convenient point, as at 4, and the ends of bar 3 are shown in the instance illustrated as formed with loops similar in contour with that of bars 1 and 2. The ends of these loops are spot welded or similarly secured rigidly to a curved plate 5, of suitable size and shape, preferably similar to that shown in Figs. 5 and 6, the curved plate 5 being illustrated as having the same contour as the ends of the loops of the bars. The rear bar 3 may be brought forward as shown and clamped to the impact bars 1 and 2 at their center portion by suitable means such as the clamp 6. This method of securing the loop ends of the bars together forms a strong connection which is also pleasing to the eye.

A further form of the invention is shown in the three bar bumper in Fig. 3. The impact section of this bumper comprising bars 7, 8, and 9. The rear or attaching bar may be formed the same as bar 3 in Fig. 1. This type of bumper may have its bars connected to the curved plate 5 in a manner similar to that shown in Fig. 4, which discloses the middle bar 8 and the rear bar 3 connected to the curved plate 5 by rivets 10. The bars 3 and 8 have curved loop end portions extending through only a portion of the arc of the loop, and are positioned end to end against the plate 5 and secured thereto by the rivets 10. As shown in Fig. 7, the upper and lower bars 7 and 9 have their ends curved to pass around the plate 5 and are also secured thereto by similar rivets 10. Fig. 8 shows the three main bars in cross-section riveted to the plate 5.

It is apparent that this method of connecting the ends of bumper bars will facilitate manufacture and will also form a strong bumper which will be pleasing to the eye.

I claim:

1. In an automobile bumper, an impact member comprising a plurality of vertically aligned, transversely extending bars having loop ends thereon, a rear bar being forwardly bent to engage said impact member at its midsection and a pair of curved plates adapted to be secured to the ends of said impact members and said rear bar in vertical alignment.

2. In an automobile bumper, an impact member comprising a pair of vertically aligned, transversely extending bars having loop ends thereon, a rear bar having loop ends thereon, a pair of curved plates, said impact bars being secured to said plates in spaced relation and said rear bar being secured to said plates at a point between said impact bars.

3. In an automobile bumper, an impact member comprising a pair of vertically aligned, transversely extending bars having loop ends thereon, a rear bar having loop ends thereon, a pair of curved plates, said impact bars being welded to said plates in spaced relation and said rear bar being welded to said plates at a point between said impact bars.

4. In an automobile bumper an impact member comprising three (3) vertically aligned transversely extended bars having loop ends thereon, a rear bar having loop ends thereon, a pair of curved plates adapted to coincide with the loop ends of said bars, said impact bars being secured to said plate in spaced vertical relation and said rear bar being secured to said plates laterally aligned with the central bar of said impact member.

5. In an automobile bumper an impact member comprising three (3) vertically aligned transversely extended bars having loop ends thereon, a rear bar having loop ends thereon, a pair of curved plates adapted to coincide with the loop ends of said bars, said impact bars being riveted to said plates in spaced vertical relation and said rear bar being riveted to said plates in lateral alignment with the central bar of said impact member.

In testimony whereof, I have signed this specification.

JOHN M. REIFSNIDER.